(12) United States Patent
Kim et al.

(10) Patent No.: US 9,998,953 B2
(45) Date of Patent: Jun. 12, 2018

(54) LOAD MANAGEMENT

(71) Applicant: KT CORPORATION, Gyeonggi-do (KR)

(72) Inventors: Hyung-Jung Kim, Seoul (KR); Do-Young Kwak, Seoul (KR); Jong-Sik Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days. days.

(21) Appl. No.: 13/919,146

(22) Filed: Jun. 17, 2013

(65) Prior Publication Data
US 2013/0344874 A1 Dec. 26, 2013

(30) Foreign Application Priority Data
Jun. 22, 2012 (KR) .................. 10-2012-0067345

(51) Int. Cl.
*H04W 36/00* (2009.01)
*H04W 28/08* (2009.01)
(Continued)

(52) U.S. Cl.
CPC ....... *H04W 28/08* (2013.01); *H04W 28/0289* (2013.01); *H04W 84/045* (2013.01)

(58) Field of Classification Search
CPC ..... H04W 16/08; H04W 16/14; H04W 16/16; H04W 16/18; H04W 36/00; H04W 36/02; H04W 36/06; H04W 36/10; H04W 36/12; H04W 36/14; H04W 36/16; H04W 36/18; H04W 36/20; H04W 36/24; H04W 36/26; H04W 36/30; H04W 48/06; H04W 28/02; H04W 28/08; H04W 28/12; H04W 28/16; H04W 28/24; H04W 28/26; H04W 72/00;
(Continued)

(56) References Cited

U.S. PATENT DOCUMENTS 5,241,685 A * 8/1993 Bodin ................... H04W 48/20
455/436
6,393,282 B1 * 5/2002 Iimori ........................ 455/432.1
(Continued)

FOREIGN PATENT DOCUMENTS

KR 10-2003-0042390 A 5/2003
KR 10-0828544 B1 5/2008
(Continued)

OTHER PUBLICATIONS

H.S. Kim et al., "A Technical Trend Analysis of LTE SON", Electronics and Telecommunications Trends, Dec. 2010, pp. 144-156, vol. 25 No. 6, Electronics and Telecommunications Research Institute, Daejeon, Republic of Korea.

*Primary Examiner* — German Viana Di Prisco
(74) *Attorney, Agent, or Firm* — IP Legal Services, LLC

(57) ABSTRACT

The disclosure is related to adaptive load management in a femtocell network. A load state of a femtocell base station may be determined as one of a low load state, a middle load state, and a high load state. According to the determined load state, a reserved service capacity and an available service capacity of the femtocell base station may be adaptive controlled. Furthermore, at least one handover trigger condition associated with the femtocell base station may be controlled according to the determined load state of the femtocell base station.

14 Claims, 6 Drawing Sheets

(51) Int. Cl.
*H04W 28/02* (2009.01)
*H04W 84/04* (2009.01)

(58) Field of Classification Search
CPC ..... H04W 72/02; H04W 72/04; H04W 72/06; H04W 72/08; H04W 72/10; H04W 72/12; H04W 72/14; H04W 64/00
USPC .... 455/436, 453, 444, 435.1, 438, 561, 443, 455/437, 439, 502; 370/328, 331, 329, 370/252, 332, 235, 236
See application file for complete search history.

(56) References Cited

U.S. PATENT DOCUMENTS

| | | | |
|---|---|---|---|
| 8,644,841 B1 * | 2/2014 | Oroskar | H04W 28/08 455/442 |
| 2004/0259528 A1 | 12/2004 | Gandhi et al. | |
| 2009/0059857 A1 | 3/2009 | Kim et al. | |
| 2009/0137249 A1 * | 5/2009 | Horn et al. | 455/435.2 |
| 2010/0124179 A1 * | 5/2010 | Lee et al. | 370/252 |
| 2010/0240373 A1 * | 9/2010 | Ji et al. | 455/436 |
| 2010/0323698 A1 * | 12/2010 | Rune | H04W 48/06 455/436 |
| 2011/0032909 A1 | 2/2011 | Park et al. | |
| 2011/0244870 A1 | 10/2011 | Lee | |
| 2012/0069737 A1 * | 3/2012 | Vikberg et al. | 370/232 |
| 2013/0107704 A1 * | 5/2013 | Dinan | 370/230 |
| 2013/0225181 A1 * | 8/2013 | Radulescu | H04W 36/22 455/442 |
| 2013/0237233 A1 * | 9/2013 | Radulescu et al. | 455/440 |

FOREIGN PATENT DOCUMENTS

| | | |
|---|---|---|
| KR | 10-2009-0023064 A | 3/2009 |
| KR | 10-2009-0046035 A | 5/2009 |
| KR | 10-2009-0112323 A | 10/2009 |
| KR | 10-2010-0117752 A | 11/2010 |
| KR | 10-2011-0111374 A | 10/2011 |
| KR | 10-1072446 B1 | 10/2011 |
| KR | 10-1107898 B1 | 1/2012 |
| KR | 10-1141426 B1 | 5/2012 |
| WO | WO 2012067120 A1 * 5/2012 ............ H04W 28/08 |

* cited by examiner

LOAD MANAGEMENT

CROSS REFERENCE TO PRIOR APPLICATIONS

The present application claims priority under 35 U.S.C. § 119 to Korean Patent Application No. 10-2012-0067345 (filed on Jun. 22, 2012), which is hereby incorporated by reference in its entirety.

BACKGROUND

The present disclosure relates to communication, more particularly, to load management in a femtocell network.

A femtocell is a small cellular base station that provides a mobile communication service in a comparatively narrow area. The femtocell has various advantages of expanding indoor service coverage, improving service quality, and effectively providing various wired and wireless integrated services. In addition, the femtocell has low installation and maintenance fees. Further, the femtocell can be installed in any location where an Internet channel is available. One of the main purposes of introducing a femtocell is to distribute network load in a macrocell and to increase service capacity of the macrocell.

Due to advantages of the femtocell, many femtocells have been installed and available over various public and private places. Through such femtocells, users have been enabled to use seamless communication services. In order to provide such a seamless communication service, it might be required to efficiently manage load in a femtocell network according to a load state of each femtocell base station.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a reserved service capacity and an available service capacity of a respective femtocell base station in a femtocell network may be controlled according to a load state of the respective femtocell base station in order to balance load in the femtocell network.

In accordance with another aspect of the present embodiment, at least one handover trigger condition of a femtocell base station and neighbor femtocell base stations may be controlled according to a load state of the femtocell base station in order to balance load in a femtocell network.

In accordance with at least one embodiment, a method may be provided for adaptive load management in a femtocell network. The method may include determining a load state of a femtocell base station as one of a low load state, a middle load state, and a high load state and controlling a reserved service capacity and an available service capacity of the femtocell base station according to the determined load state of the femtocell base station.

When the femtocell base station has the high load state, the reserved service capacity may be decreased and the available service capacity may be increased by the decrement of the reserved service capacity. When the femtocell base station has the low load state, a current reserved service capacity of the femtocell base station may be compared with a default reserved service capacity. The current reserved service capacity may be increased to the default reserved service capacity and a current available service capacity may be decreased to a default available service capacity when the current reserved service capacity is smaller than the default reserved service capacity.

The method may include controlling at least one handover trigger condition associated with the femtocell base station according to the determined load state of the femtocell base station.

When the femtocell base station is determined as having the high load state, at least one handover trigger condition may be adjusted as less restrictive for easily initiating handover from the femtocell base station to at least one neighbor femtocell base station. Further, at last one handover trigger condition may be adjusted as more restrictive for preventing easy initiation of handover from at least one neighbor femtocell base station to the femtocell base station.

When the femtocell base station is determined as having the low stat load, a neighbor femtocell base station having a high load state may be searched for. Then, at least one handover trigger condition may be tightened up (i.e., adjusted as more restrictive) for preventing easy initiation of handover from the femtocell base station to the searched neighbor femtocell base station.

In accordance with another embodiment of the present invention, an apparatus may be provided for adaptive load management in a femtocell network. The apparatus may include a load detect unit and a setup unit. The load detect unit may be configured to determine a load state of a femtocell base station as one of a low load state, a middle load state, and a high load state based on a number of user equipments currently coupled to the femtocell base station. The setup unit may be configured to control a reserved capacity and an available service capacity of the femtocell base station according to the determined load state of the femtocell base station, and to control at least one handover trigger condition associated with the femtocell base station according to the determined load state of the femtocell base station When the load detect unit determines that the femtocell base station has the high load state, the setup unit may be configured to decrease the reserved service capacity and increase the available service capacity by the decrement of the reserved service capacity. When the load detect unit determines that the femtocell base station has the high load state, the setup unit may be configured to increase a current reserved service capacity to a default reserved service capacity and decrease a current available service capacity to a default available service capacity if the current reserved service capacity is smaller than the default reserved service capacity.

When the femtocell base station is determined as having the high load state, the setup unit may be configured to perform at least one of: easing at least one handover trigger condition for handover from the femtocell base station to at least one neighbor femtocell base station and tightening up at last one handover trigger condition for handover from at least one neighbor femtocell base station to femtocell base station.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
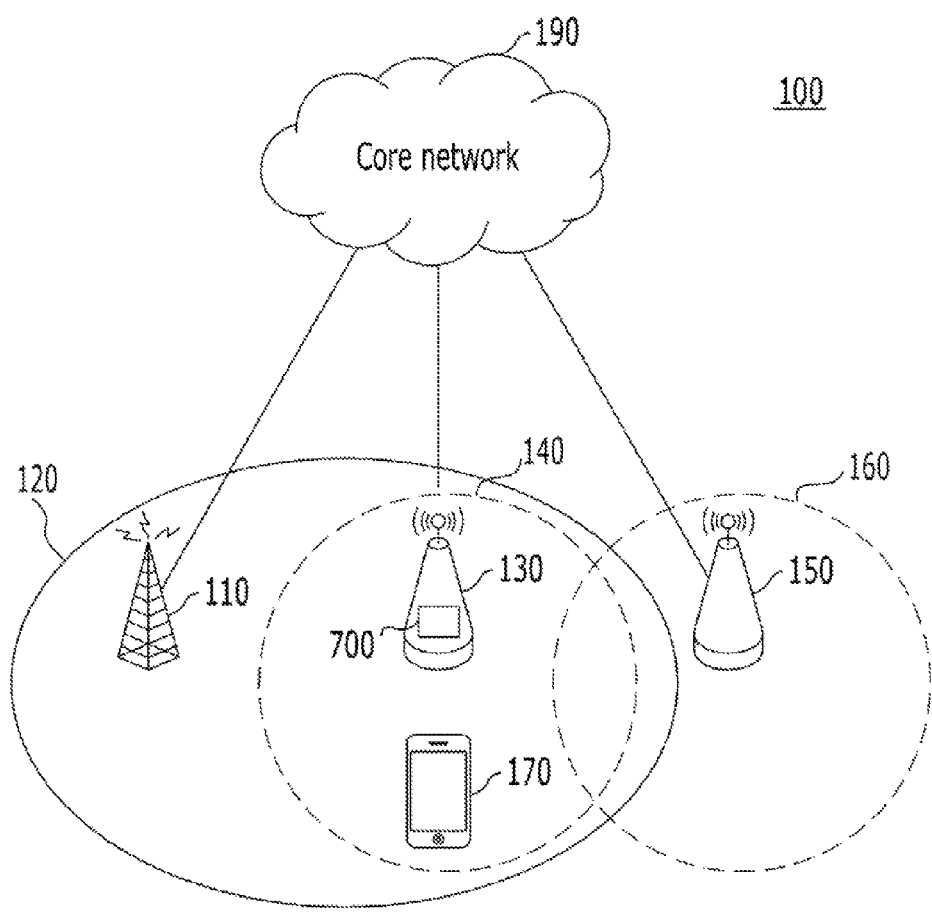
FIG. 1 illustrates a femtocell network in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a service capacity of a femtocell base station may be divided into a reserved service capacity and an available service capacity and controlled according to a load state of the femtocell base station in order to balance access load in a femtocell network. That is, when a femtocell base station has a high load state, the reserved service capacity is decreased and the available service capacity is increased by the decrement of the reserved service capacity in order to maximize the service capacity of the femtocell base station having the high load state. In addition, handover trigger conditions of femtocell base stations may be controlled in order to further balance load in the femtocell network. Such load management in a femtocell network in accordance with at least one embodiment will be briefly described with reference to FIG. 1.

FIG. 1 illustrates a femtocell network in accordance with at least one embodiment of the present invention.

Referring to FIG. 1, communication network 100 may include heterogeneous cells such as macrocell 120 and a plurality of femtocells 140 and 160. Such a plurality of femtocells 140 and 160 may form a femtocell network. Communication network 100 may further include core network 190 coupled to macrocell 120 and a plurality of femtocells 140 and 160. Macrocell 120 may be formed and managed by macrocell base station 110. First femtocell 140 may be formed and managed by femtocell base station 130 and second femtocell 160 may be formed and managed by femtocell base station 150.

Typically, femtocell base stations 130 and 150 may be located inside or outside macrocell 120, which is a service area of macrocell base station 110. Accordingly, service areas of femtocell base stations 130 and 150 may be included in that of macrocell base station 110 or the service area of femtocell base stations 130 and 150 may be excluded from that of macrocell base station 110. Furthermore, service areas of femtocell base stations 130 and 150 may overlap with that of macrocell base station 110. Femtocell base stations 130 and 150 may be installed for improving a quality of service (QoS) at a certain area or for maintaining a certain level of a QoS at a certain area. For example, femtocell base stations 130 and 150 may be installed at indoor shadow areas or outdoor shadow areas. Femtocell base stations 130 and 150 may be installed at an area having excessive data traffic (i.e., congestion area) and/or at a cell having excessive load.

As shown in FIG. 1, femtocell base stations 130 and 150 and macrocell base station 110 are coupled to core network 190. Core network 190 may be a central part of a telecommunication network that provides various services including call routing to users who are connected by an access network. Core network 190 may include a plurality of nodes for aggregation, authentication, call control/switching, charging, service invocation, and gateways.

Such communication network 100 may further include load management unit 700 in accordance with at least one embodiment. Load management unit 700 may perform adaptive load management according to load states of femtocell base stations (i.e., femtocell base stations 130 and 150). For example, load management unit 700 may determine load states of femtocell base stations 130 and 150 and control a service capacity of femtocell base stations 130 and 150 in order to maximize the service capacity thereof. Furthermore, load management unit 700 may control handover trigger conditions of femtocell base stations in order to further balance load in the femtocell network. Load management unit 700 is illustrated as being embedded in femtocell base station 130 in FIG. 1, but the present invention is not limited thereto. Load management unit 700 may be embedded in one of nodes connected to a femtocell network, for example, an operation and management server (not shown). Furthermore, load management unit 700 may be a stand-alone node connected to a femtocell network. Such load management unit 700 may include parameter setup unit 710, load detect unit 730, parameter control unit 750, data collection unit 770, and handover condition setup unit 790. These will be described in detail with reference to FIG. 7. Hereinafter, service capacity control in accordance with at least one embodiment will be described.

Referring back to FIG. 1, femtocell base stations 130 and 150 may receive an access request from user equipment 170 and determine whether a service capacity thereof reaches a service certain threshold. If the service capacity reaches the certain threshold, femtocell base station s 130 and 150 may deny the access request. Otherwise, femtocell base stations 130 and 150 may allow the access request from user equipment 170. Such a service capacity may be referred to as a maximum service capacity. In order to efficiently manage such capacity, the maximum capacity may be divided into a reserved service capacity and an available service capacity and separately controlled in order to balance load in a femtocell network in accordance with at least one embodiment.

The maximum service capacity may denote a total capacity of a respective femtocell base station. That is, the maximum service capacity may be the total number of active users (i.e., active user equipments) that a respective femtocell base station allows access and provides a requested service simultaneously.

The reserved service capacity may denote a reserved service capacity of a respective femtocell base station for preferred users such as a preferred call. That is, the reserved service capacity may be the number of user equipments that a respective femtocell base station reserves for allowing accesses thereof and providing a preferred service such as a preferred call. The preferred call may be a call assigned with a predetermined priority. For example, the preferred call may be a call having a high Quality of Service (QoS) priority, such as a voice over internet protocol (VoIP) call. The preferred call may be a call handed off from neighbor cells. Furthermore, the preferred call may be an emergency call, such as a call to a specific place including a police station or a fire department. The preferred call may include a VoIP call, a hand-in call, and an emergency call, but the present invention is not limited thereto.

The available service capacity may denote a capacity available to general users after reserving a capacity for preferred user equipments (i.e., a reserved service capacity).

In accordance with at least one embodiment, the maximum service capacity, the reserved service capacity, and the available service capacity may be managed by setting and managing parameters as follows.

TABLE 1

| Name | Definition |
| --- | --- |
| Max_Active_User | It denotes a maximum service capacity: it might be the maximum number of active users (i.e., user equipments) that a femtocell base station can allow access and provide a related service at the same time. |
| Available_Active_User | It denotes an available service capacity: it might be the number of users (i.e., user equipments) that a femtocell base station can allow access and provide a related service for normal services (may include normal calls and preferred calls) at the same time. |
| Reserve_User | It denotes a reserved service capacity: it might be the number of reserved users (i.e., user equipments) that a femtocell base station can allow access and provide a related service only for the preferred services (i.e., preferred call) at the same time. It might be the number of users reserved for allowing a preferred call. |

The parameter Max_Active_User may denote the maximum service capacity of respective femtocell base stations 130 and 150. That is, the parameter Max_Active_User may be set based on the maximum number of users (i.e., user equipment) that respective femtocell base stations 130 and 150 can allow access and provide a service for calls, including a normal call and a preferred call, at the same time.

The parameter of Available_Active_User may denote the available service capacity of respective femtocell base stations 130 and 150. That is, the parameter Available_Active_User may be determined based on the number of users (i.e., user equipments) that respective femtocell base stations 130 and 150 can allow access and provide a service for normal services (i.e., normal call) at the same time.

The parameter of Reserve_User may denote the reserved service capacity of respective femtocell base stations 130 and 150. The parameter of Reserve_User may be set based on the number of reserved users (i.e., user equipments) that respective femtocell base stations 130 and 150 can allow access and provide a service for the preferred call at the same time. Accordingly, the parameter of Max_Active_User may be equal to the sum of the parameters of Available_Active_User and Reserve_User.

Such parameters may be set up as a number, for example, an integer number denoting the number of users, but the present invention is not limited thereto. The parameters may be set manually or automatically by a service provider or a service provider server. For example, the parameters may be set upon the initiation of femtocell base stations 130 and 150. After the initial setup of the parameters, femtocell base stations 130 and 150 may regularly update parameters in accordance with at least one embodiment. For example, femtocell base stations 130 and 150 may update the parameters of Reserve_User and Available_Active_User within a range of the parameter of Max_Active_User. When updating the parameters, femtocell base stations 130 and 150 may refer to statistical values calculated based on information accumulated for a predetermined time period. Such information may be obtained from call access requests or results of monitoring status of a femtocell base station during a predetermined time period. The information may include the number of user equipments simultaneously in service at a femtocell base station in a certain time period, the number of calls handed in from neighbor base stations in a certain time period, the number of VoIP calls in a certain time period, the number of calls invoked at each time period, and the number of normal calls and the number of preferred calls requested in a predetermined time period, and but the present invention is not limited thereto.

In accordance with at least one embodiment, the reserved service capacity and the available service capacity may be adaptively controlled according to a load state of a respective femtocell base station in order to balance load in a femtocell network. For example, when a load state of a femtocell base station is changed to a high load state, the reserved service capacity is decreased by a predetermined number and the available service capacity is increased by the decrement of the reserved service capacity in order to maximize a service capacity of a femtocell base station having a high load state.

The load state of a respective femtocell base station may denote an overall processing load of a respective femtocell base station in accordance with at least one embodiment. For example, such a load state of a respective femtocell base station may be measured based on the number of user equipments in service, for example, active user equipments currently coupled to and proved with a related service from the respective femtocell base station. The present invention, however, is not limited thereto. The load state of a respective femtocell base station may be measured based on various factors including a processing load, a data traffic state, and so forth.

In accordance with at least one embodiment, a load state of a respective femtocell base station may be classified into a high load state, a middle load state, and a low load state according to the number of active user equipments simultaneously coupled thereto and receiving related services therefrom. The load states of a respective femtocell base station may be defined as equations as follows.

TABLE 2

| Load state | Equation |
| --- | --- |
| Low load state | 0 < The number of user equipments in service < H1 |
| Middle load state | H1 < The number of user equipments in service < H2 |
| High load state | H2 < The number of user equipments in service < N |

H1, H2, and N are integer values defined by a service provider or an operator where N is greater than H2, H2 is greater than H1, and H1 is greater than 0 (i.e., 0<H1<H2<N). For example, when a femtocell base station can simultaneously provide a service to 16 user equipments, N is set as 16 and B is set as 3, where N denotes the maximum service capacity and B is the reserved service capacity. Based on these factors, such variables H1 and H2 may be determined. For example, H1 may be set as 8 and H2 may be set as 12 by a service provider or an operator.

Using such table 2, a load state of a femtocell base station may be determined in accordance with at least one embodiment of the present invention. Based on the determined load state, a reserved service capacity and a handover trigger condition of a respective femtocell base station may be dynamically and adaptively controlled.

Particularly, load management unit 700 may dynamically change the parameters such as Avaiable_Active_User and Reserve_User according to a load state of an associated femtocell base station. For example, the available service capacity (i.e., a parameter Avaiable_Active_User) and the reserved service capacity (i.e., a parameter Reserve_User) may be controlled when a respective femtocell base station becomes to have a high load state from a low load stat or from a middle load state. Particularly, the reserved service capacity (i.e., a parameter Reserve_User) is decreased and the available service capacity (i.e., a parameter Available_ Active_User) is increased by the decrement of the reserved service capacity. That is, load management unit 700 may maximize the service capacity of the femtocell base station having the high load state.

Furthermore, load management unit 700 may adaptively control a handover trigger condition in order to induce active user equipments to be handed off to neighbor femtocell base stations having a low load state or to prevent user equipments from hand-in. Particularly, load management unit 700 may ease (i.e., adjust as less restrictive) a handover trigger condition to induce user equipments to be headed off from a femtocell base station having a high load state to a neighbor femtocell base station having a low load state. On the contrary, load management unit 700 may tighten up (i.e., adjust as more restrictive) a handover trigger condition for preventing user equipments from hand-in from a neighbor femtocell base station to a femtocell base station having a high load state.

As described, the reserved service capacity and the available service capacity may be adaptively controlled based on a load state of respective femtocell base station in order to maximize the service capacity thereof in accordance with at least one embodiment. Such operation will be described with reference to FIG. 2.

Figure 2:
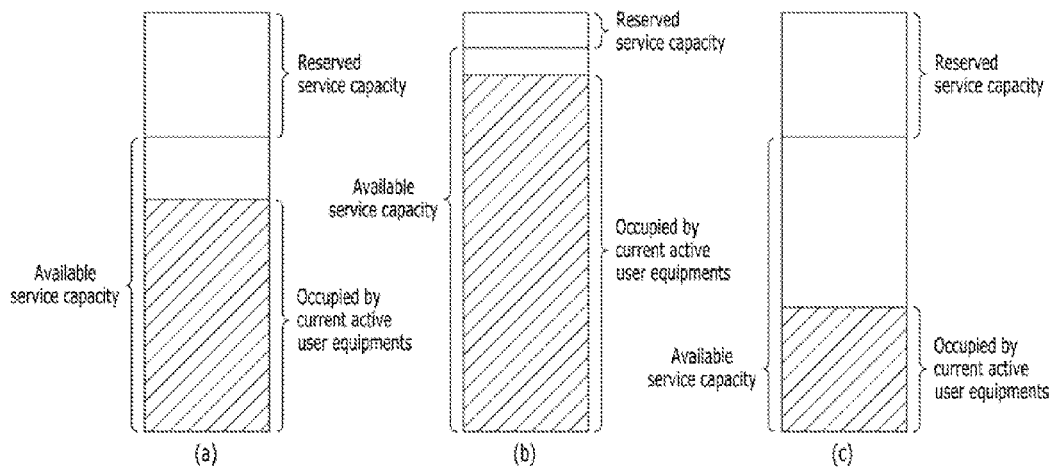
FIG. 2 illustrates control of a reserved service capacity and an available service capacity in accordance with at least one embodiment.

FIG. 2 illustrates control of a reserved service capacity and an available service capacity in accordance with at least one embodiment of the present invention.

In FIG. 2, a first diagram (a) shows capacity control in a femtocell base station having a low load state or a middle load state. A second diagram (b) shows capacity control when a load state of a femtocell base station changes from the middle load state to a high load state. A third diagram (c) shows capacity control when a load state of a femtocell base station changes back from the high load stat to the low load state of a femtocell base station.

Referring to the first diagram (a) of FIG. 2, when a femtocell base station has a low load state or a middle load state, load management unit 700 may maintain a default available service capacity and a default reserved service capacity in accordance with at least one embodiment. The default available service capacity and the default reserved service capacity may be an initial available service capacity and an initial reserved service capacity. The default reserved service capacity may be set with a parameter Reserve_User based on the number of user equipments reserved for a preferred service. For example, the parameter Reserve_User may be set with a predetermined integer number that denotes the number of user equipments reserved for a preferred service such as a preferred call. The default available service capacity may be set with a parameter Avaiable_Active_User based on the number of user equipments allowed for a service. For example, the parameter Avaiable_Active_User may be set with a predetermined integer number that denotes the number of user equipments allowed for a service. The default available service capacity and the default reserved service capacity may be determined and set by a service provider or a certain operator. For example, since a femtocell base station can generally support 16 user equipments at the same time, the default reserved service capacity is set as about 4 user equipments and the default available service capacity is set as about 8 user equipments.

As shown in the second diagram (b) of FIG. 2, when the load state of the femtocell base station changes from the low or middle load state to a high load state, the femtocell base station controls the reserved service capacity and the available service capacity to decrease the load and to maximum the service capacity thereof. Particularly, the femtocell base station decreases the reserved service capacity based on load increment and increases the available service capacity as much as the decrement of the reserved service capacity. Such control may be performed by changing the parameters of Reserve_User and Avaiable_Active_User. For example, the parameter Reserve_User may be decreased by a predetermined number such as one and the parameter Avaiable_ Active_user may be increased by a predetermined number.

Furthermore, handover trigger conditions of the femtocell base station and neighbor femtocell base stations may be controlled when the femtocell base station has the high load state. For example, a handover trigger condition may be eased (i.e., adjusted as less restrictive) to induce user equipments to be handed over from the femtocell base station having a high load state to neighbor femtocell base stations having a low load state. Such operation will be described in detail with reference to FIG. 3.

As shown in the third diagram (c) of FIG. 2, when the femtocell base station changes from the high load state to the low load state, the changed reserved service capacity and the changed available service capacity may be restored to the default reserved service capacity and the default available service capacity in accordance with at least one embodiment. Particularly, load management unit 700 increases the reserved service capacity which has been decreased and decrease the available service capacity which has been increased. Such control may be performed by changing back the values of the parameters of Reserve_User and Avaiable_ Active_User to default values (i.e., initial values).

Furthermore, the controlled handover trigger condition of the femtocell base station may be restored back to the original handover trigger condition. For example, the femtocell base station may tighten up (i.e., adjust as more restrictive) the eased handover trigger condition back to the default condition. Such operation will be described in detail with reference to FIG. 3.

When the femtocell base station changes from the high load state to the middle load state, such adaptive load management may not be performed. It is because the femtocell base station may become back to the high load state again after the high load state changes to the middle load states. Accordingly, the adaptive load management procedure may be paused for a predetermined time period.

As described above, handover trigger conditions may be also adaptively and dynamically controlled based on a load state of a femtocell base station in accordance with at least one embodiment. Such operation will be described in detail with reference to FIG. 3.

Figure 3:
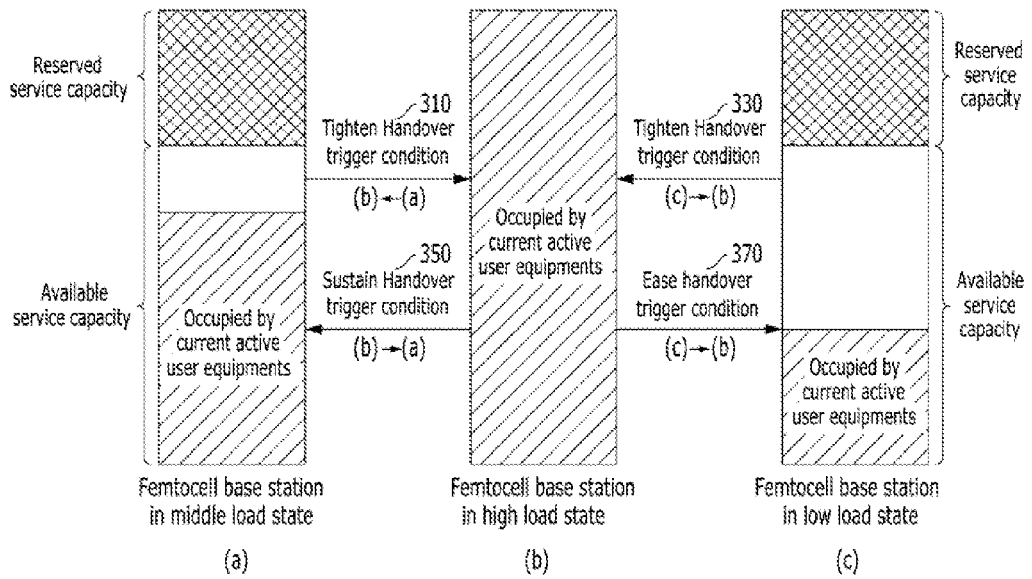
FIG. 3 illustrates control of a handover trigger condition based on a load state of a femtocell base station in accordance with at least one embodiment.

FIG. 3 illustrates control of a handover trigger condition based on a load state of a femtocell base station in accordance with at least one embodiment of the present invention.

In FIG. 3, a first diagram (a) shows a femtocell base station having a middle load state. A second diagram (b) illustrates a femtocell base station having a high load state. A third diagram (c) depicts a femtocell base station having a low load state.

When a femtocell base station is in a middle load state as shown in the first diagram (a), the femtocell base station may maintain a default handover trigger condition for handover to neighbor femtocell base stations. For example, load management unit 700 may maintain a default handover trigger condition for triggering handover to a neighbor femtocell base station. Such a default handover trigger condition may include information on signal qualities of neighbor base stations. The signal quality may be signal strength. The default handover trigger condition may further include a time-to-trigger value. The default handover trigger condition may be set initially by a service provider or by an operator, but the present invention is not limited thereto.

The load state of the femtocell base station may become a high load state as shown in the second diagram (b). As shown, a service capacity is completely occupied by active user equipments coupled to the femtocell base station. In this case, load management unit 700 may control handover trigger conditions in neighbor information for inducing the active user equipments to be easily handed over to a neighbor femtocell base station having a low load state and for preventing user equipments from handing in from a neighbor femtocell base station. Particularly, load management unit 700 tightens up (i.e., adjusts as more restrictive) handover trigger condition 310 for handover from (a) to (b) and handover trigger condition 330 for handover from (c) to (b) in addition to control the capacity. Furthermore, load management unit 700 eases handover trigger condition 370 for handover from (b) to (c). However, load management unit 700 maintains handover trigger condition 350 from handover from (b) to (a).

When the load state of the femtocell base station changes back to the low load state as shown in diagram (c), the default handover trigger condition may be restored. For example, adjusted handover trigger condition 370 may be tightened up (i.e., adjusted as more restrictive) to the default handover trigger condition and adjusted handover trigger conditions 330 and 310 may be eased (i.e., adjusted as less restrictive) to the default handover trigger conditions.

However, when the load state of the femtocell base station changes back to the middle load state as shown in diagram (a), eased handover trigger condition 370 and tightened handover trigger conditions 310 and 330 may be maintained until the middle load state is changed to the low load state. It is because the load state of the femtocell base station may be changed back to the high load state as described above.

In general, a handover procedure is triggered based on signal qualities of neighbor base stations. The signal quality may be signal intensity. Such signal qualities may be monitored, measured, and reported by respective user equipments to associated femtocell base stations. That is, a source base station may initiate handover of a user equipment to a target base station when the signal quality of the target base station is higher than a predetermined threshold and maintains such signal quality for a predetermined period (i.e., a time to trigger). Accordingly, the handover trigger condition may include information on a signal quality and a time to trigger. In accordance with at least one embodiment, at least one of the signal quality and the time to trigger may be controlled according to a load state of an associated femtocell base station.

For example, in order to ease a handover trigger condition, a predetermined positive offset is added to a signal quality of a femtocell base station or a predetermined negative offset is added to a time to trigger of the handover trigger condition. Alternatively, the predetermined positive offset is added to the measured signal quality and the predetermined negative offset is added to the time to trigger.

As a result of adding the predetermined positive offset to the measured signal quality of a neighbor base station, the femtocell base station recognizes a signal quality of a target base station to be better than the real signal quality. Accordingly, handover may be easily triggered from the source base station to the target base station. Furthermore, as a result of adding the negative offset to the time to trigger, the handover may be easily initiated although a target base station maintains a high signal quality for a comparatively short time period.

For example, in order to tighten up a handover trigger condition, a predetermined negative offset is added to a measured and reported signal quality of a femtocell base station or a predetermined positive offset is added to a time to trigger of the handover trigger condition. Alternatively, the predetermined negative offset is added to the measured signal quality and the predetermined positive offset is added to the time to trigger.

As a result of adding the predetermined negative offset to the measured signal quality of a neighbor base station, the femtocell base station recognizes a signal quality of a target base station to be worse than the real signal quality. Accordingly, handover may be easily triggered from the source base station to the target base station. Furthermore, as a result of adding the positive offset to the time to trigger, the handover may be not initiated although a neighbor base station maintains a higher signal quality for a comparatively long time period.

As described, a handover trigger condition is controlled to balance load in a femtocell network in accordance with at least one embodiment. Particularly, a predetermined positive offset is added to a measured and reported signal quality of a neighbor femtocell base station in order to induce active user equipments to be easily handed over to the neighbor femtocell base station. Such operation will be described with reference to FIG. 4.

Figure 4:
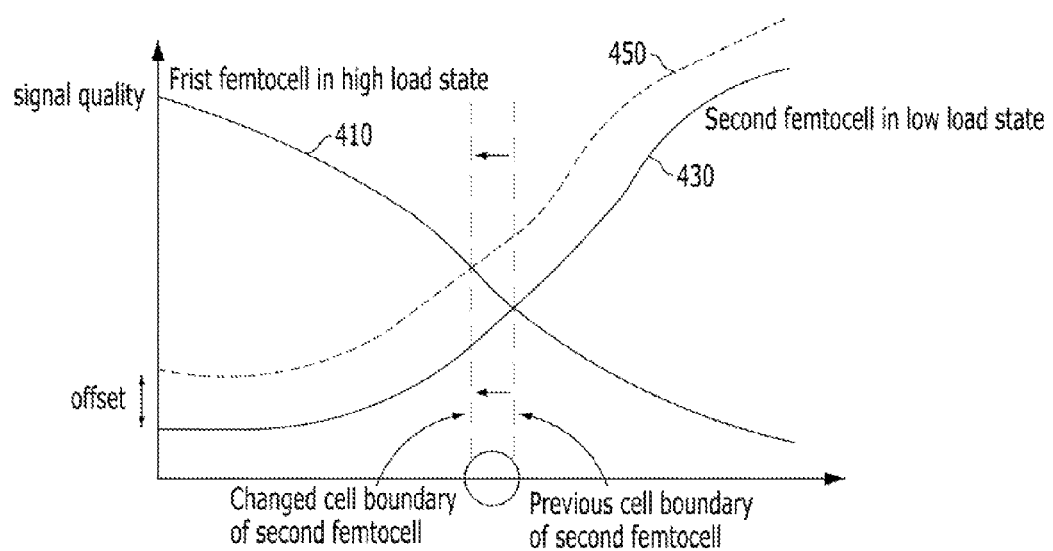
FIG. 4 is a graph showing measured and reported signal qualities of femtocell base stations.

FIG. 4 is a graph showing measured and reported signal qualities of femtocell base stations.

Referring to FIG. 4, first curve 410 shows a measured and reported signal quality of a first femtocell base station in a high load state. As described, such a signal quality may be regularly measured and reported by user equipments coupled to the first femtocell base station. Second curve 430 shows a signal quality of a second femtocell base station in a low load state. User equipments coupled to the second femtocell base station regularly measures and report the measurement to the second femtocell base station.

In accordance with at least one embodiment, in order to control load in a femtocell network, a predetermined positive offset may be added to the measured and reported signal quality (i.e., curve 430) of the second femtocell base station in the low load state. The user equipments coupled to the first femtocell base stations in the high load state may recognize the signal quality of the second femtocell base station in the low load state to be better than the real signal quality thereof. That is, the user equipments recognize third curve 450 as the signal quality of the second femtocell base station although the real signal quality of the second femtocell base station is second curve 430. As a result, the user equipments coupled to the first femtocell base station in the high load state may easily initiate handover to the second femtocell base station in the low load state. Such operation may cause the same effect of temporally expanding a cell boundary of the second femtocell base station in the low load state.

As described, load management in a femtocell network may be performed by controlling the number of reserved users and the number of active users and further controlling a handover trigger condition according to a load state of a respective femtocell base station in accordance with at least one embodiment of the present invention. Such load management will be described with reference to FIG. 5 and FIG. 6.

Figure 5:
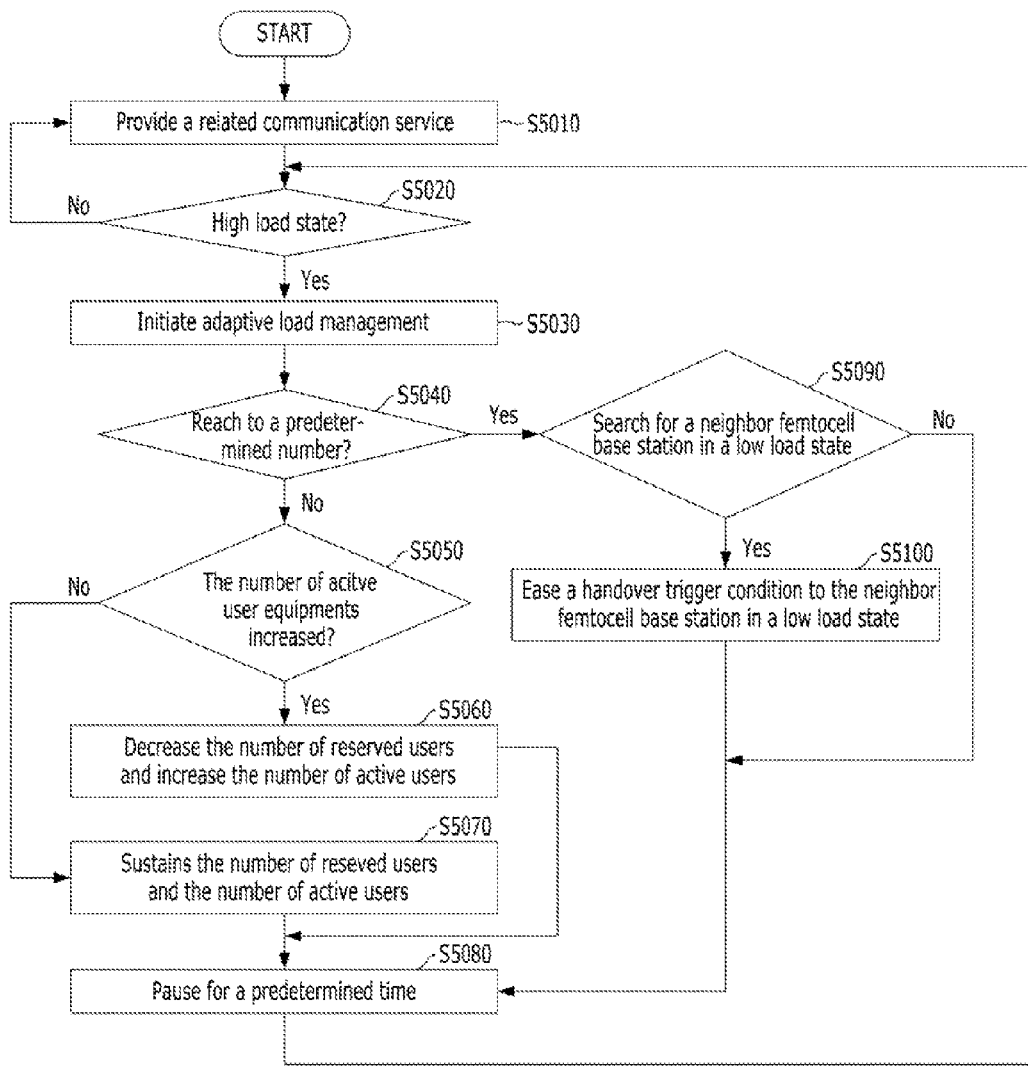
FIG. 5 illustrates load management of a femtocell base station having a high load state in accordance with at least one embodiment.

FIG. 5 illustrates load management of a femtocell base station having a high load state in accordance with at least one embodiment of the present invention.

Referring to FIG. 5, a communication service may be provided to user equipments at step S5010. For example, femtocell base station 130 provides a communication service to active user equipments (i.e., user equipment 170). The active user equipments may be referred to as an active user. The active user equipment (i.e., the active user) denotes user equipments coupled to a femtocell base station and provided with a related service from the femtocell base station. That is, the active user equipment may be a user equipment in service.

As described, a femtocell base station has a fixed service capacity. Such a fixed service capacity is determined based on a processing power and an amount of data traffic and set as the number of users (i.e., user equipments) that a femtocell base station can provide a service at the same time. In general, a femtocell base station has a service capacity of about 4 to 16 active users. Such a service capacity of a femtocell base station may be managed by dividing into a reserved service capacity and an available service capacity. The reserved service capacity denotes the number of reserved users for preferred services. The available service capacity denotes the number of active users for normal services. Such normal services may include the preferred services. The reserved service capacity and the available service capacity may be controlled according to the load state of the femtocell base station.

At step S5020, determination may be made whether a femtocell base station has a high load state. For example, a load state of femtocell base station 130 is determined based on the number of active users (i.e., active user equipments) that are currently accessed to femtocell base station 130 and provided with a related service at the same time. As described, according to the number of active users simultaneously coupled to femtocell base station 130, the load state thereof is determined as one of a low load state, a middle load state, and a high load state in accordance with at least one embodiment. Such determination may be performed regularly or upon an event. For example, the determination may be performed at a predetermined interval or performed upon the receipt of an access request from a user equipment.

As described, the load state of the femtocell base station was described as being determined based on the number of active users using table 2. The present invention, however, is not limited thereto. The load state of a femtocell base station may be determined based on various other factors.

When a load state thereof is determined as not a high load state, (No—S5020), the related communication service may be continuously provided to user equipments at step S5010. For example, when the number of active users is not greater than a predetermined number, femtocell base station 130 determines as not having the high load state. In this case, femtocell base station 130 continuously provides a related service to active user equipments.

When a load state thereof is determined as a high load state (Yes—S5020), an adaptive load management procedure may be initiated at step S5030. As described, the adaptive load management in accordance with at least one embodiment controls the number of reserved users and the number of available active users at first. That is, the number of reserved users is decreased by a predetermined number and the number of available active users is increased as much as the decrement of the number of reserved users.

In order to control such the reserved service capacity and the available service capacity, determination may be made as to whether the number of reserved users reaches a predetermined number at step S5030. For example, femtocell base station 130 compares the parameter Reserve_User with a predetermined threshold such as "0."

When the number of reserved users does not reach the predetermined number (No—S5040), determination may be made as to whether the number of current active users has been increased as compared to the previous number of active users at step S5050. For example, load management unit 700 may count the number of active users at a regular interval and stores the counting result. Load management unit 700 may compare the current number of active users with the stored previous number of active users.

When it is determined that the number of active users is not increased as compared to that of the previous period (Yes—S5050), the number of reserved users may be decreased by a predetermined number and the number of available active users may be increased by the predetermined number at step S5060. For example, load management unit 700 decreases the number of reserved users by one and increases the number of available active users by one.

When the number of active users is not increased (No—S5060), the number of reserved users and the number of available active users may be sustained at step S5070. For example, load management unit 700 sustains the number of reserved users and the number of available active users.

Such comparison is performed to determine whether a load state of a corresponding femtocell base station has been sustained or changed. That is, when the number of current active users is equal to the previous number of active users, it means that the load state has not been changed for a while. In this case, the number of reserved users or the number of available active users is not controlled.

On the contrary, when the number of current active users is increased as compared to the previous number of active users, it means that the load state has been changed. Accordingly, load management unit 700 controls the number of reserved users or the number of available active users.

Referring back to the step S5030, determination may be made as to whether the number of reserved users reaches a predetermined number. For example, femtocell base station 130 compares the parameter Reserve_User with a predetermined threshold such as "0." When the number of reserved users reaches the predetermined number (Yes—S5030), one of neighbor base stations having a low load state may be searched for at step S5080.

For example, the reserved service capacity (i.e., the number of reserved users) may be all occupied due to the receipt of preferred calls, such as emergency calls or hand-in calls, or due to the decrement made by the previous adaptive load management. That is, when the number of reserved users becomes "0," a load management unit searches for neighbor femtocell base stations having a low load state.

When the load management unit founds multiple femtocell base stations in a low load state, the load management unit may select one from the multiple femtocell base stations in consideration of various factors such as signal strength, data traffic, processing power, distance, and so forth.

When a neighbor base station having a low load state is found (Yes—S5090), a handover trigger condition associated with the found neighbor femtocell base station may be eased (i.e., adjusted as less restrictive) at step S5100. For example, load management unit 700 eases the handover trigger condition associated with the searched neighbor femtocell base station in order to induce the active user equipments currently coupled to femtocell base station 130 having the high load state to be handed over to the found neighbor femtocell base station in a low load state. That is, load management unit 700 eases a handover trigger condition of a neighbor femtocell base station having a low load state, which is stored in neighbor information of femtocell base station 130 having the high load state.

As described, in order to ease a handover trigger condition, load management unit 700 may add a predetermined positive offset to a signal quality of the selected neighbor femtocell base station or add a predetermined negative offset to a time to trigger of the handover trigger condition associated with the selected neighbor femtocell base station. Alternatively, the load management unit may add the predetermined positive offset to the measured signal quality and the predetermined negative offset to the time to trigger.

As a result of adding the predetermined positive offset to the measured signal quality of a selected neighbor femtocell base station, user equipments may recognize a signal quality of the selected neighbor femtocell base station to be better than the real signal quality. Accordingly, handover may be easily triggered from the femtocell base station in the high load state to the selected femtocell base station having a low load state. Furthermore, as a result of adding the negative offset to the time to trigger, the handover may be easily initiated although the selected neighbor femtocell base station maintains a higher signal quality for a comparatively short time period.

After controlling the handover trigger condition, the adaptive load management procedure may be paused for a predetermined time at step S5080. For example, the load management unit may stand by for the predetermined time.

As described, load management unit 700 decreases the reserved service capacity and increases the available service capacity as a load state of a femtocell base station increases. That is, by increasing the available service capacity as much as the decrement of the reserved service capacity, the femtocell base station can allow access of more user equipments and provides a service to more user equipments. When the reserved service capacity is exhausted and the available service capacity cannot be increased any more, one of neighbor femtocell base stations having a low load state is selected and a handover trigger condition associated with the selected neighbor femtocell base station is eased in order to induce user equipments to be handed over to the selected neighbor femtocell base station in accordance with at least one embodiment of the present invention.

After controlling the reserved service capacity and the handover trigger condition, a high load state of a femtocell base station may be changed to a low load state. In this case, load management unit 700 may control the reserved service capacity and the available service capacity back to a default reserved service capacity and a default available service capacity in accordance with at least one embodiment. Furthermore, the load management unit may restore a handover trigger condition associated with the selected neighbor femtocell base station. Such operation will be described in detail with reference to FIG. 6.

Figure 6:
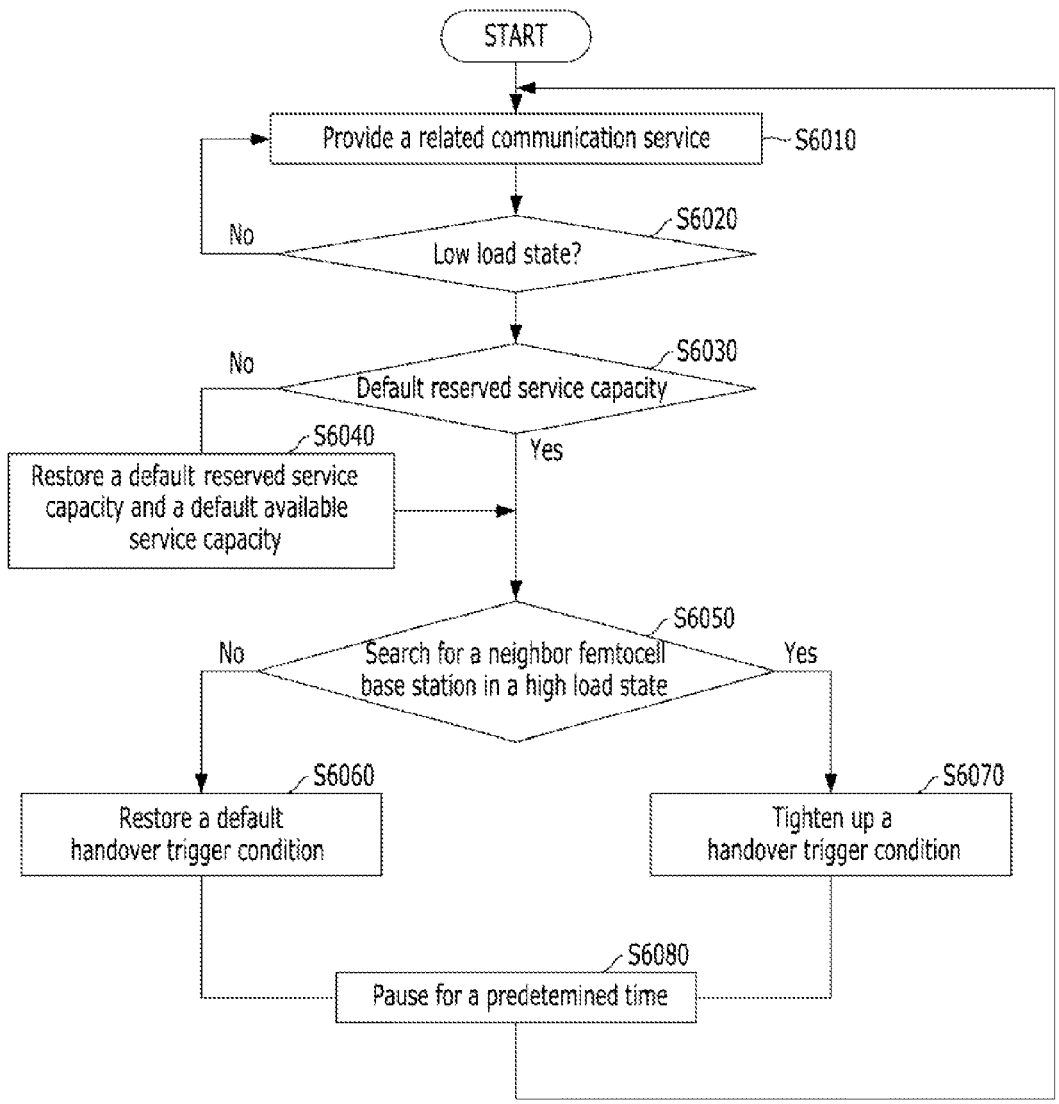
FIG. 6 illustrates load management in a femtocell base station having a low load state in accordance with at least one embodiment.

FIG. 6 illustrates load management in a femtocell base station having a low load state in accordance with at least one embodiment of the present invention.

Referring to FIG. 6, a communication service may be provided to user equipments at step S6010. For example, femtocell base station 130 provides a communication service to active users (i.e., user equipment 170).

At step S6020, determination may be made whether a femtocell base station has a low load state. For example, a load state of femtocell base station 130 is determined based on the number of active users (i.e., active user equipments) that are currently accessed to femtocell base station 130 and provided with a related service at the same time. As described, according to the number of active users simultaneously coupled to femtocell base station 130, the load state thereof is determined as one of a low load state, a middle load state, and a high load state in accordance with at least one embodiment. Such determination may be performed regularly or upon an event. For example, the determination may be performed at a predetermined interval or performed upon the receipt of an access request from a user equipment.

As described, the load state of the femtocell base station was described as being determined based on the number of active users. The present invention, however, is not limited thereto. The load state of a femtocell base station may be determined based on various other factors.

When the femtocell base station is determined as having the low load state (Yes—S6020), determination may be made as to whether the reserved service capacity is a default reserved service capacity at step S6030. For example, a load state of the femtocell base station may be changed from a high load state to a low load state due to the previous adaptive load management. The previous adaptive load management has changed the reserved service capacity (i.e., the number of reserved users). That is, the number of reserved users has been reduced to be smaller than the default number of reserved users.

When the reserved service capacity in not the default reserved service capacity (No—S6030), the reserved service capacity may be changed back to the default reserved service capacity at step S6040. For example, load management unit 700 changes the number of reserved users to the default number of reserved users. Furthermore, load management unit 700 also changes the number of available active users to the default number of available active users.

When the reserved service capacity is the default reserved service capacity (Yes—S6030), a neighbor femtocell base station in a high load state may be searched for at step S6050. For example, load management unit 700 searches for a femtocell base station in a high load state among neighbor femtocell base stations.

When no femtocell base station in the high load state is found (No—S6050), a tightened handover trigger condition may be restored back to a default handover trigger at step S6060. That is, load management unit 700 may change a handover trigger condition that has been tightened up (i.e., adjusted as more restrictive) for a neighbor femtocell base station having a high load state which is stored in neighbor information of the femtocell base station having a low load state.

When a neighbor femtocell base station in the high load state is found (Yes—S6050), an associated handover trigger condition may be tightened (i.e., adjusted as more restrictive) at step S6070. For example, load management unit 700 tightens up a handover trigger condition associated with the found femtocell base station in the high load state, which is recorded in neighbor information stored in the femtocell base station in the low load state.

Alternatively, when the found neighbor femtocell base station was in the high load state at the previous period, the load management unit may sustain the associated handover trigger condition because the associated handover trigger condition has already tightened up at the previous period.

In order to tighten up a handover trigger condition, load management unit 700 adds a predetermined negative offset to a measured and reported signal quality of the found neighbor femtocell base station or adds a predetermined positive offset to a time to trigger of the handover trigger condition. Alternatively, load management unit 700 adds the predetermined negative offset to the measured signal quality and the predetermined positive offset to the time to trigger.

As a result of adding the predetermined negative offset to the measured signal quality of the found neighbor femtocell base station, user equipments may recognize a signal quality of the found neighbor femtocell base station to be worse than the real signal quality. Accordingly, handover may be not triggered to the found neighbor femtocell base station. Furthermore, as a result of adding the positive offset to the time to trigger, the handover may be not initiated although a neighbor base station maintains a higher signal quality for a comparatively long time period.

As described, load management unit 700 performs the adaptive load management in order to balance load in a femtocell network in accordance with at least one embodiment. Particularly, such load management unit controls a reserved service capacity and an available service capacity of a femtocell base station having a high load state and further controls a handover trigger condition associated with a predetermined neighbor femtocell base station. Load management unit 700 will be described in detail with reference to FIG. 7.

Figure 7:
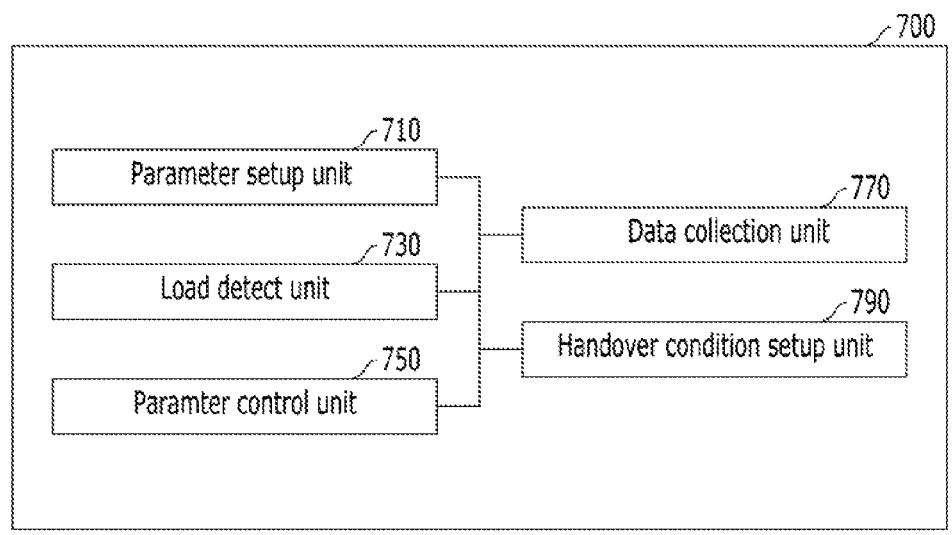
FIG. 7 shows a load management unit for adaptive load management in a femtocell network in accordance with at least one embodiment.

FIG. 7 shows a load management unit for adaptive load management in a femtocell network in accordance with at least one embodiment of the present invention.

Referring to FIG. 7, load management unit 700 balances load in a femtocell network. Such load management unit 700 may be embedded in a femtocell base station as shown in FIG. 1. The present invention, however, is not limited thereto. Load management unit 700 may be embedded in one of nodes connected to a femtocell network, for example, an operation and management server. Furthermore, load management unit 700 may be a stand-alone node connected to a femtocell network. Such load management unit 700 may include parameter setup unit 710, load detect unit 730, parameter control unit 750, data collection unit 770, and handover condition setup unit 790. Load management unit might be implemented as a load management processor including one or more processor devices/logic, memory, program code, input/output (I/O) and related circuitry to implement the described functionality in a physical device. Furthermore, parameter setup unit 710, load detect unit 730, parameter control unit 750, data collection unit 77, and handover condition setup unit 790 might be implemented as a parameter setup processor, a load detect processor, a parameter control unit, a data collection unit, and a handover condition setup unit, respectively. Such respective unit may include one or more processor devices/logic, memory, program code, input/output (I/O) and related circuitry to implement the described functionalities in a physical device.

Parameter setup unit 710 may set up parameters related to a reserved service capacity and an available service capacity of a femtocell base station. Particularly, parameter setup unit 710 sets up a value of a parameter Reserve_User for the reserved service capacity. Parameter setup unit 710 also sets up a value of a parameter Available_Active_User for the available service capacity. As described, the reserved service capacity is reserved resource for a preferred call, such as a call with a predetermined priority assigned (i.e., a voice over internet protocol (VoIP) call, a hand-in call, and an emergency call), but the present invention is not limited thereto.

Data collection unit 770 may collect information on load states of femtocell base stations. For example, when load management unit 700 is embedded in a femtocell base station, data collection unit 770 may collect information on load states of neighbor femtocell base stations through communication with the neighbor femtocell base stations. When load management unit 700 is embedded in an operation & management server or is a stand-alone node, associated femtocell base stations may report load states to data collection unit 770 at a regular interval or upon a request. Such load information may include data directly indicating a load state of a corresponding femtocell base station, such as a low load state, a middle load state, or a high load state. Alternatively, the load information may include information that might be used for determining a load state of a corresponding femtocell base station, such as a previous reserved service capacity (i.e., the number of previous reserved users), a current reserved service capacity (i.e., the number of current reserved users), a previous available service capacity (i.e., the number of previous available active users), a current available service capacity (i.e., the number of current available active users), an occupied available service capacity (i.e., the number of current active user equipments), and a remaining of a reserved service capacity.

Load detect unit 730 may determine load states of femtocell base stations based on the information collected by data collection unit 770. Load detect unit 730 may perform such determination at a regular interval or upon a predetermined event. For example, load detect unit 730 may extract information directly indicating a load state of a femtocell base station from the information collected by data collection unit 770. Alternatively, load detect unit 730 may extract information related to a load state of a femtocell base station from the collected information of data collection unit 770 and determine the load state of the femtocell base station using table 2 with the extracted information.

Parameter control unit 750 may control parameters related to a reserved service capacity and an available service capacity based on the load state of a respective femtocell base station, which is determined by load detect unit 730. For example, parameter control unit 750 control related parameters such as Reserve_User and Available_Active_User for decreasing the number of reserved users by a predetermined number and increasing the number of available active users by the predetermined number, thereby increasing the available service capacity of a corresponding femtocell base station.

Particularly, parameter control unit 750 decreases a value of the parameter Reserve_User for decreasing the number of reserved users and increases a value of the parameter Available_Active_User for increasing the number of available active users when a femtocell base station increases in a load state as compared to that in a previous period.

Parameter control unit 750 may further control the parameters Reserve_User and Available_Active_User for changing back the controlled reserved service capacity and the controlled available service capacity to a default reserved service capacity and a default available service capacity when the corresponding femtocell base station changes back from the high load state to the low load state.

Handover condition setup unit 790 may control a handover trigger condition associated to a predetermined femtocell base station and restore a controlled handover trigger condition back to a default handover trigger condition in accordance with at least one embodiment. Such operation may be performed when an excessive load of a femtocell base station is not controlled by controlling the reserved service capacity and the available service capacity thereof.

Particularly, handover condition setup unit 790 may control a handover trigger condition recorded in neighbor information stored in a femtocell base station having a high load state or a low load state. For example, when load detect unit 730 determines that a femtocell base station has a high load state, handover trigger condition setup unit 790 eases (i.e., adjust as less restrictive) a handover trigger condition associated with a femtocell base station having a low load state, which is recorded in neighbor information stored in the femtocell base station having the high load state. Furthermore, when load detect unit 730 determines that a femtocell base station has a low load state, handover trigger condition setup unit 790 tightens up (i.e., adjust as more restrictive) a handover trigger condition associated with a femtocell base station having a high load state, which is recorded in neighbor information stored in the femtocell base station having a low load state.

Furthermore, handover condition setup unit 790 restores the eased handover trigger condition back to a default handover trigger condition when a femtocell base station changes back to a low load state after having the high load state. In addition, handover trigger condition setup unit 790 restores the tightened handover trigger condition of a femtocell base station having a high load state back to the default handover trigger condition when the femtocell base station changes from a high load state to a low load state.

As described, in order to ease a handover trigger condition, handover condition setup unit 790 adds a predetermined positive offset to a signal quality of a neighbor femtocell base station or adds a predetermined negative offset to a time to trigger associated with the neighbor femtocell base station. Alternatively, handover condition setup unit 790 adds the predetermined positive offset to the signal quality and the predetermined negative offset to the time to trigger at the same time.

As described, in order to tighten up a handover trigger condition, handover condition setup unit 790 adds a predetermined negative offset to a signal quality of a neighbor femtocell base station or adds a predetermined positive offset to a time to trigger associated with the neighbor femtocell base station. Alternatively, handover condition setup unit 790 adds the predetermined negative offset to the signal quality and the predetermined positive offset to the time to trigger at the same time.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of adaptive load management in a femtocell network, the method comprising:
   determining a load state of a femtocell base station as one of predetermined load states including a low load state, a middle load state, and a high load state based on a number of active user equipments coupled to the femtocell base station;
   performing a first load control procedure of controlling a reserved service capacity and an available service capacity of the femtocell base station according to the determined load state of the femtocell base station; and
   performing a second load control procedure of controlling at least one handover trigger condition associated with the femtocell base station according to the determined load state of the femtocell base station,
   wherein when the femtocell base station is in the high load state,
   the first load control procedure includes decreasing the reserved service capacity and increasing the available service capacity by the decrement of the reserved service capacity; and
   the second load control procedure includes at least one of:
      adjusting as less restrictive at least one handover trigger condition for handover from the femtocell base station to at least one neighbor femtocell base station; and
      adjusting as more restrictive at least one handover trigger condition for handover from at least one neighbor femtocell base station to the femtocell base station; and wherein when the femtocell base station is in the high load state,
   the adjusting of the second load control procedure is performed after the reserved service capacity decreased through the first load control procedure reaches below a predetermined level.

2. The method of claim 1, wherein the determining includes:
   analyzing the number of active user equipments currently accessing the femtocell base station through a corresponding communication link; and
   determining the high load state based on the number of active user equipments currently accessing the femtocell base station.

3. The method of claim 1, wherein the performing a first load control procedure includes:
   when the femtocell base station has the low load state, comparing a current reserved service capacity of the femtocell base station with a default reserved service capacity; and
   increasing the current reserved service capacity to the default reserved service capacity and decreasing a current available service capacity to a default available service capacity when the current reserved service capacity is less than the default reserved service capacity.

4. The method of claim 1, wherein the adjusting as less restrictive the handover trigger condition includes:
   searching for at least one neighbor femtocell base station having a low load state; and
   easing a corresponding handover trigger condition for handover from the femtocell base station to the searched neighbor femtocell base station having the low load state.

5. The method of claim 1, wherein the adjusting as less restrictive the handover trigger condition includes:
   adding a predetermined positive offset to information on a measured signal quality of the at least one neighbor femtocell base station.

6. The method of claim 1, wherein the adjusting as less restrictive the handover trigger condition includes:
   adding a predetermined negative offset to information on a time to trigger associated with the at least one neighbor femtocell base station.

7. The method of claim 1, wherein the adjusting as more restrictive the handover trigger condition includes:
   adding a predetermined negative offset to information on a measured signal quality of the at least one neighbor femtocell base station.

8. The method of claim 1, wherein the adjusting as more restrictive the handover trigger condition includes:
   adding a predetermined positive offset to information on a time to trigger associated with the at last one neighbor femtocell base station.

9. The method of claim 1, wherein when the high load state of the femtocell base station changes to the low load state, including:
   restoring each handover trigger condition to a default handover trigger condition.

10. The method of claim 1, wherein when the femtocell base station is determined as having the low load state, the performing a second load control procedure includes:
    searching for a neighbor femtocell base station having a high load state; and
    adjusting as more restrictive at least one handover trigger condition for handover from the femtocell base station to the searched neighbor femtocell base station.

11. An apparatus for adaptive load management in a femtocell network, the apparatus comprising:
- a load detect processor configured to determine a load state of a femtocell base station as one of predetermined load states including a low load state, a middle load state, and a high load state based on a number of user equipments currently coupled to the femtocell base station;
- a setup processor configured to perform a first load control procedure of controlling both of a reserved service capacity and an available service capacity of the femtocell base station according to the determined load state of the femtocell base station, and to perform a second load control procedure of controlling at least one handover trigger condition associated with the femtocell base station according to the determined load state of the femtocell base station,
- wherein when the femtocell base station is determined as having the high load state,
- the first load control procedure includes decreasing the reserved service capacity and increasing the available service capacity by the decrement of the reserved service capacity; and
- the second load control procedure includes at least one of:
  - adjusting as less restrictive at least one handover trigger condition for handover from the femtocell base station to at least one neighbor femtocell base station; and
  - adjusting as more restrictive at last one handover trigger condition for handover from at least one neighbor femtocell base station to femtocell base station; and
- wherein when the femtocell base station is in the high load state,
- the adjusting of the second load control procedure is performed after the reserved service capacity decreased through the first load control procedure reaches below a predetermined level.

12. The apparatus of claim 11, wherein the setup processor is configured to:
- when the load detect processor determines that the femtocell base station has the low load state, increase a current reserved service capacity to a default reserved service capacity and decrease a current available service capacity to a default available service capacity if the current reserved service capacity is less than the default reserved service capacity.

13. The apparatus of claim 11, wherein the setup processor is configured to perform, for adjusting as less restrictive the handover trigger condition, at least one of:
- adding a predetermined positive offset to information on a measured signal quality of the at least one neighbor femtocell base station; and
- adding a predetermined negative offset to information on a time to trigger associated with the at least one neighbor femtocell base station.

14. The apparatus of claim 11, wherein the setup processor is configured to perform, for adjusting more restrictive the handover trigger condition, at least one of:
- adding a predetermined negative offset to information on a measured signal quality of the at least one neighbor femtocell base station; and
- adding a predetermined positive offset to information on a time to trigger associated with the at last one neighbor femtocell base station.

* * * * *